US008639414B2

(12) United States Patent
Suzaki et al.

(10) Patent No.: US 8,639,414 B2
(45) Date of Patent: Jan. 28, 2014

(54) OPERATION APPARATUS FOR ON-BOARD DEVICES IN AUTOMOBILE

(75) Inventors: Yukihiko Suzaki, Niiza (JP); Yasuo Ooishi, Niiza (JP); Toshiaki Hosogai, Niiza (JP); Atsuki Kakinuma, Niiza (JP); Takeo Tokunaga, Niiza (JP)

(73) Assignee: Honda Access Corp., Niiza-shi, Saitama (JP)

( * ) Notice: Subject to any disclaimer, the term of this patent is extended or adjusted under 35 U.S.C. 154(b) by 551 days.

(21) Appl. No.: 12/948,274

(22) Filed: Nov. 17, 2010

(65) Prior Publication Data

US 2011/0160933 A1   Jun. 30, 2011

(30) Foreign Application Priority Data

Dec. 25, 2009   (JP) ................................. 2009-294985

(51) Int. Cl.
*G06F 3/02* (2006.01)
(52) U.S. Cl.
USPC ............. 701/36; 345/157; 345/158; 345/175; 708/143; 708/146
(58) Field of Classification Search
USPC ............. 701/36; 345/157, 158, 175; 708/143, 708/146
See application file for complete search history.

(56) References Cited

U.S. PATENT DOCUMENTS

| | | | | |
|---|---|---|---|---|
| 5,617,312 A | * | 4/1997 | Iura et al. | 700/83 |
| 6,043,805 A | * | 3/2000 | Hsieh | 345/158 |
| 6,115,513 A | * | 9/2000 | Miyazaki et al. | 382/317 |
| 6,373,472 B1 | * | 4/2002 | Palalau et al. | 345/173 |
| 6,614,422 B1 | * | 9/2003 | Rafii et al. | 345/168 |
| 6,703,999 B1 | * | 3/2004 | Iwanami et al. | 345/158 |
| 6,766,036 B1 | * | 7/2004 | Pryor | 382/103 |
| 7,042,442 B1 | * | 5/2006 | Kanevsky et al. | 345/169 |
| 7,242,388 B2 | * | 7/2007 | Lieberman et al. | 345/158 |
| 7,289,645 B2 | * | 10/2007 | Yamamoto et al. | 382/104 |
| 7,295,904 B2 | | 11/2007 | Kanevsky et al. | |

(Continued)

FOREIGN PATENT DOCUMENTS

| | | |
|---|---|---|
| JP | 2000-132306 A | 5/2000 |
| JP | 2005-321948 A | 11/2005 |

(Continued)

OTHER PUBLICATIONS

Decision to Grant a Patent dated May 4, 2012, issued in corresponding Korean Patent Application No. 10-2010-0131553.

(Continued)

*Primary Examiner* — Thomas Black
*Assistant Examiner* — Peter D Nolan
(74) *Attorney, Agent, or Firm* — Westerman, Hattori, Daniels & Adrian, LLP

(57) ABSTRACT

An operation apparatus includes image capturing device capable of capturing images of a plurality of mark members provided in assembled members in a compartment; determining device capable of determining individually whether each of the mark members is or is not shielded on the basis of the image data taken and outputted by the image capturing device; and operation instructing device configured to output an operation command to on-board devices in accordance with a result of the determining by the determining device. Accordingly, it is easy for an operator to understand operational steps, thereby effectively preventing an erroneous operation due to the operator's misunderstanding. Furthermore, it is possible to simplify a determination logic of the operation instructing device, and also possible to easily provide a retrofitted option.

18 Claims, 13 Drawing Sheets

(56) References Cited

U.S. PATENT DOCUMENTS

| | | | |
|---|---|---|---|
| 7,437,488 B2* | 10/2008 | Ito et al. | 710/15 |
| 8,270,669 B2* | 9/2012 | Aichi et al. | 382/103 |
| 8,319,832 B2* | 11/2012 | Nagata et al. | 348/114 |
| 8,378,970 B2* | 2/2013 | Nishida et al. | 345/158 |
| 8,406,961 B2* | 3/2013 | Pathak et al. | 701/48 |
| 2004/0046744 A1* | 3/2004 | Rafii et al. | 345/168 |
| 2005/0025345 A1* | 2/2005 | Ohta et al. | 382/116 |
| 2005/0063564 A1* | 3/2005 | Yamamoto et al. | 382/104 |
| 2005/0238202 A1* | 10/2005 | Sato et al. | 382/104 |
| 2006/0055672 A1* | 3/2006 | Krocker et al. | 345/158 |
| 2008/0231608 A1* | 9/2008 | Nagata | 345/173 |
| 2009/0002342 A1* | 1/2009 | Terada et al. | 345/175 |
| 2009/0273563 A1* | 11/2009 | Pryor | 345/157 |
| 2010/0103103 A1* | 4/2010 | Palanker et al. | 345/158 |
| 2011/0063425 A1* | 3/2011 | Tieman | 348/61 |

FOREIGN PATENT DOCUMENTS

| | | |
|---|---|---|
| JP | 2006-312347 A | 11/2006 |
| JP | 2007-055356 A | 3/2007 |
| JP | 3941786 B2 | 7/2007 |
| KR | 1020080097077 A | 4/2008 |
| TW | 200619982 A | 6/2006 |

OTHER PUBLICATIONS

Japanese Office Action dated Oct. 26, 2011, issued in corresponding Japanese Patent Application No. 2009-294985.

Taiwanese Office Action dated Apr. 16, 2013, issued in corresponding Taiwanese Patent Application No. 099143352 (5 pages).

* cited by examiner

OPERATION APPARATUS FOR ON-BOARD DEVICES IN AUTOMOBILE

TECHNICAL FIELD

An operation apparatus allows easy operation of on-board devices (for example, devices such as an audio system, an air conditioner and a car navigation system), which are capable of receiving operational inputs from an occupant in an automobile, without requiring manual operation to be performed on operating portions of such on-board devices.

BACKGROUND OF THE INVENTION

A gesture remote-controlling operation apparatus has conventionally been known. As described in Japanese Patent No. 3941786, for example, the gesture remote-controlling operation apparatus includes: image capturing means, such as a CCD camera, to capture the positions and motions of the driver's hands on the steering wheel; and operation instructing means to output operation commands to the corresponding on-board devices in accordance with the positions and motions of the hands captured by the image capturing means.

A conventional gesture remote-controlling operation apparatus such as one disclosed in Japanese Patent No. 3941786 outputs operation commands to the corresponding on-board devices in accordance with the gestures, that is, the positions and motions of the operator's hands. For this reason, the conventional gesture remote-controlling operation apparatus requires a complex logic to determine the gestures. In addition, capturing the positions and motions of the operator's hands correctly and accurately is difficult. For example, small differences in gestures among different operators cannot be clearly distinguished. Accordingly, there have been such inconveniences as erroneous activation of the gesture remote controller due to errors in the capturing gestures, and output of wrong operation commands to on-board devices.

In this respect, as described in Japanese Patent Application Laid-open No. 2006-312347, a technique has been proposed which prevents the gesture remote controller from being activated erroneously by controlling the activation of the gesture remote controller in accordance with the closing of a through-hole provided in the steering wheel with a driver's hand. This technique, however, has various inconveniences. For example, the technique premises provision of the through-hole in the steering wheel in the manufacturing process of the steering wheel. Accordingly, it is difficult to provide the gesture remote-controlling operation apparatus as a retrofitted option. In addition, the possible position of the through-hole is quite limited. Likewise, the possible position of the image capturing means to capture whether the through-hole is closed or not is quite limited. In addition, once the gesture remote controller is activated, the gesture remote-controlling operation apparatus outputs operation commands by capturing the gestures, that is, the positions and motions, of the operator's hands as in the case of the technique disclosed in Japanese Patent No. 3941786. Accordingly, the technique of Japanese Patent Application Laid-open No. 2006-312347 also requires a complex logic, and is likely to capture gestures incorrectly, resulting in outputs of erroneous operation commands to the on-board devices.

SUMMARY OF THE INVENTION

An operation device for on-board devices in an automobile is capable of solving the conventional problems described above in a simple structure.

According to a first aspect of the operation apparatus, the operation apparatus comprises an image capturing device which captures images of a plurality of mark members provided in an assembled member in a compartment; a determining means for determining individually whether each of the mark members is or is not shielded on the basis of the image data taken and outputted by the image capturing device; and an operation instructing means for outputting an operation command to on-board devices in accordance with a result of the determining by the determining means, wherein the plurality of mark members are positioned so that an operator can shield the mark members with his/her hand from the image capturing means.

With the first aspect of the operation apparatus, the operation apparatus includes an image capturing device capable of taking images of the multiple mark members provided in the assembled member in the compartment; a determining means capable of determining individually whether each of the mark members is or is not shielded on the basis of the image data taken and outputted by the image capturing device; and an operation instructing means configured to output an operation command to the corresponding one of the on-board devices in accordance with a result of the determining performed by the determining means. Accordingly, the operation apparatus can output correctly and accurately the operation command to the on-board devices on the basis of whether each of the marks is or is not shielded by the operator's hand. In addition, the series of operational steps to be taken are so easy that the operator easily understand what to do next. Accordingly, the operation apparatus can effectively prevent the operator from erroneously operating the on-board device due to his/her misunderstanding. In addition, the operation instructing means relies on a relatively simple determination logic, so that the cost can be reduced and faster computation can be achieved. In addition, the multiple mark members are provided in the assembled members in the compartment. Accordingly, it is not necessary to drill special through-holes to be used for the image-capturing purposes in the assembled members. For this reason, providing the operation apparatus as a retrofitted option is relatively easy, and the positions of the mark members and of the image capturing means can be determined in a flexible manner with a relatively high degree of freedom.

According to a second aspect of the operation apparatus, in addition to the first aspect, the plurality of mark members are provided on the assembled member which is attachably and detachably attached to a steering wheel.

With the second aspect of the operation apparatus, the assembled member where the mark members are provided is attachably and detachably attached to the steering wheel. Accordingly, providing the operation apparatus as a retrofitted option is easier. In addition, the driver holding the steering wheel can shield the mark members easily and rapidly with his/her own hands.

According to a third aspect of the operation apparatus, in addition to the first or second aspect, the plurality of mark members includes at least one first mark member and a plurality of second mark members, when the operation instructing means is in a stand-by mode, the operation instructing means is switched to a first active mode upon determination by the determining means that at least one of the at least one first mark member is shielded, and, when the operation instructing means is in the first active mode, the operation instructing means is capable of selecting an operation target from the on-board devices when at least one of the second mark members is shielded.

With the third aspect of the operation apparatus, the operator can switch the mode of the operation instructing means from the stand-by mode to the first active mode rapidly and surely only by shielding the first mark member. In addition, when the operation instructing means is in the first active mode, the operator can select rapidly and surely the operation target from the on-board devices only by shielding one of the plurality of second mark members.

According to a fourth aspect of the operation apparatus, in addition to the third aspect, the plurality of mark members further include a plurality of third mark members, when the operation instructing means is in the first active mode, the operation instructing means is switched to a second active mode upon determination by the determining means that at least one of the second mark members is shielded, and, when the operation instructing means is in the second active mode, the operation instructing means is capable of selecting one of a plurality of operation parameters related to the operation target when at least one of the plurality of third mark members is shielded.

With the fourth aspect of the operation apparatus, when the operation instructing means is in the first active mode, the operator can select rapidly and surely one of the multiple operation parameters that are to be determined in relation to the selected operation target, that is, one of the operation contents, only by shielding at least one of the second mark members.

According to a fifth aspect of the operation apparatus, in addition to the third or fourth aspect, the operation instructing means in any of the active modes is automatically switched to the stand-by mode if the vehicle is turned to be in a predetermined state.

With the fifth aspect of the operation apparatus, when the operation instructing means is in any of the active modes, the operation instructing means is automatically switched to the stand-by mode if the state of the vehicle is turned to be in a predetermined state. Accordingly, the mode of the operation instructing means can be automatically switched back to the stand-by mode if the vehicle is running in a special state that requires the driver to concentrate on driving. Hence, the operation apparatus can surely prevent the operation instructing means from outputting unintended operation commands while the vehicle is running under such a special running state or is in the like state.

According to a sixth aspect of the operation apparatus, in addition to any of the first to fifth aspects, there is provided the operation apparatus further comprising: a recognizing means for recognizing a hand on the basis of image data taken and outputted by the image capturing device; a vehicle-speed sensor configured to detect a speed of the automobile; and an operation portion that enables an occupant to operate the on-board devices, wherein, when the operation instructing means determines that the automobile is running on the basis of a detection signal of the vehicle-speed sensor, the operation instructing means invalidates at least a part of an operation signal from the operation portion unless the recognizing means recognizes that two hands are on the steering wheel, but the operation instructing means does not invalidate the operation signal as long as the recognizing means recognizes that two hands are on the steering wheel.

With the sixth aspect of the operation apparatus, when the operation instructing means determines that the automobile is running, the operation instructing means invalidates at least a part of the operation signal from the operation portion unless the recognizing means recognizes that two hands are on the steering wheel. Accordingly, while the vehicle is running, the operating apparatus puts more emphasis on the safely driving and hence can invalidate at least a part of the driver's manual operating action by means of the operation portion of the on-board devices as in the case of conventional operation apparatuses. Even while the vehicle is running, the operation instructing means acts in a different manner on the condition that the recognizing means recognizes that two hands are on the steering wheel. Since, in this case, the operation signal outputted from the operation portion can be considered as a result of the operating action not by the driver but by a passenger, the operation instructing means withholds the invalidation of the operation signal. Accordingly, even while the vehicle is running, a passenger, i.e., an occupant other than the driver, can operate the on-board devices. This makes the operation apparatus easier-to-use and more convenient.

Here, in the present invention, "operation parameter" means an operation content which an operator should select more specifically in relation to the operation target.

The above description, other objects, characteristics and advantages of the operation apparatus will be clear from detailed descriptions which will be provided referring to the attached drawings.

BRIEF DESCRIPTION OF THE DRAWINGS

The advantages of the invention will become apparent in the following description taken in conjunction with the drawings, wherein.

DETAILED DESCRIPTION OF THE INVENTION

Hereinafter, an embodiment of the operation apparatus for on-board devices in an automobile will be described by referring to the accompanying drawings.

Figure 1:
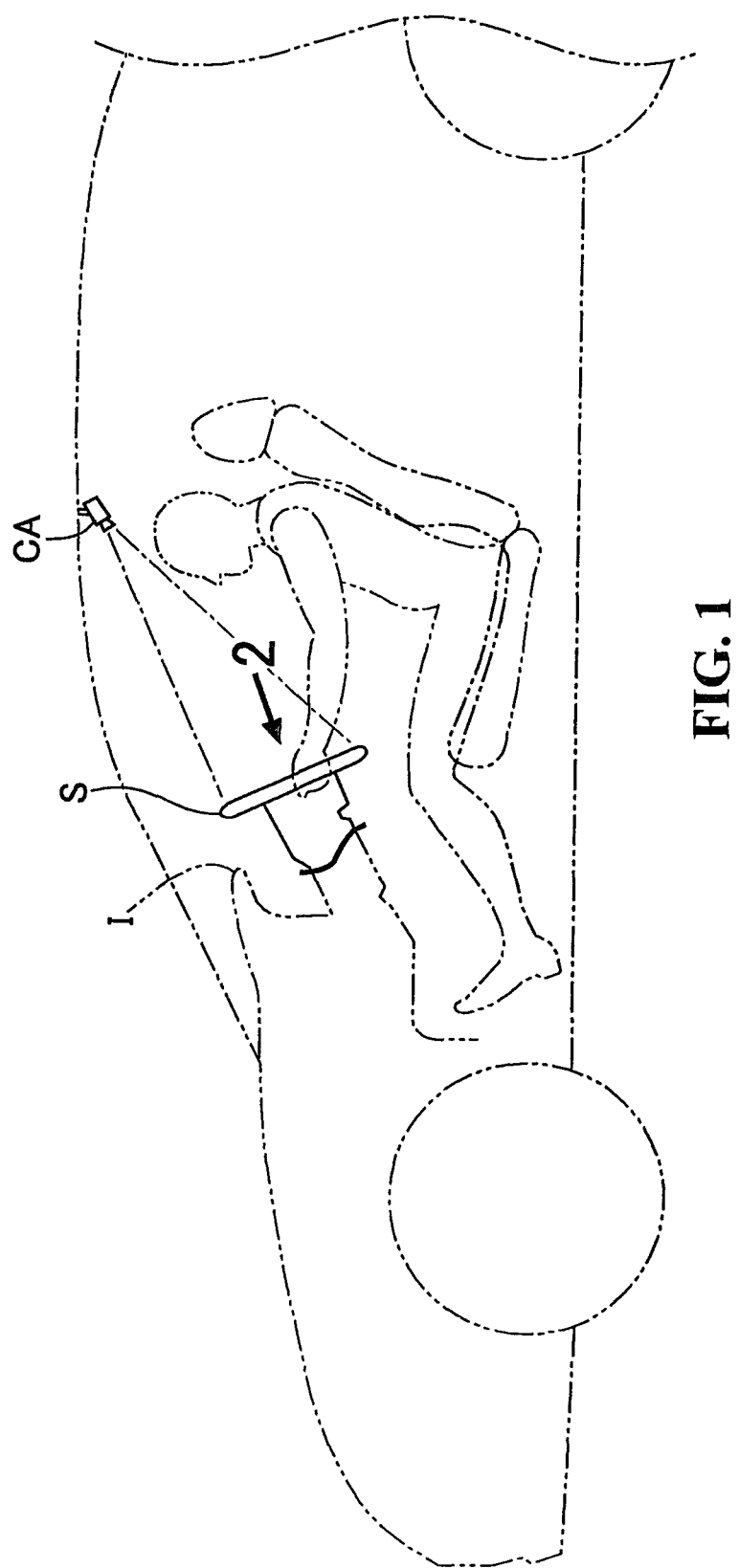
FIG. 1 is a schematic diagram illustrating the inside of the compartment of an automobile to which an embodiment of the present invention is applied.
Figure 2:
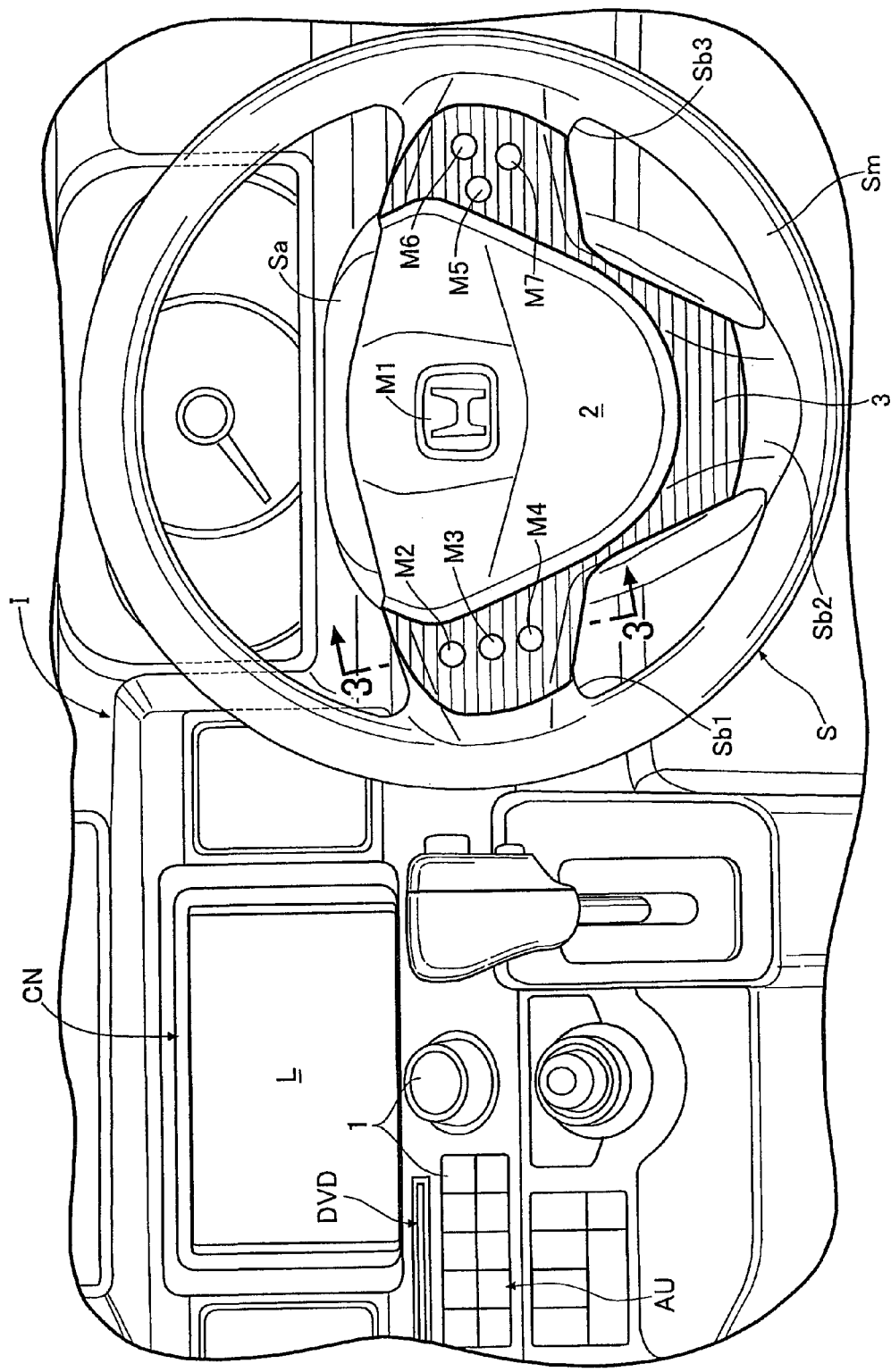
FIG. 2 is a front-side view of an instrument panel and its surrounding area of the embodiment and viewed from the driver's side.
Figure 3:
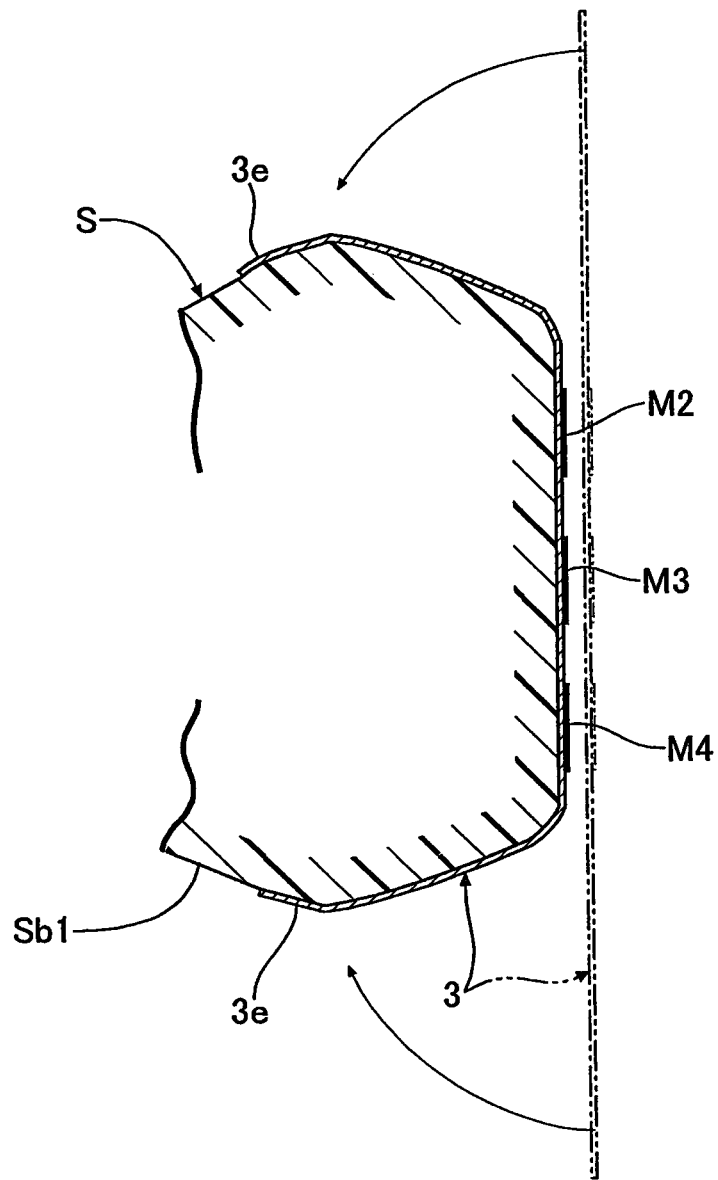
FIG. 3 is an enlarged sectional diagram taken along the line 3-3 in FIG. 2.

Firstly, referring to FIGS. 1 to 3, an instrument panel I in a compartment includes: various meters, gauges, indicators, and the like instruments, such as a speed meter; a display portion L for on-board devices, such as a car navigation system CN, an audio system AU, a video player DVD; and operation portions 1 to manually operate these on-board devices, and the like. In addition, a steering wheel S that the driver operates to steer the vehicle is provided in front of the various instruments.

The steering wheel S includes a central hub portion Sa that is connected to a steering shaft (not illustrated), a steering main body Sm that has an annular shape surrounding the central hub portion Sa, and three spoke portions Sb1 to Sb3 that connect between the steering main body Sm and the central hub portion Sa. A horn cover 2 is attachably and detachably attached to an external surface of the central hub portion Sa, and a designed H-shaped first mark M1 is attached to a central portion of an external surface of the horn cover 2.

A spoke cover 3 is attachably and detachably attached to the spoke portions Sb1 to Sb3. The spoke cover 3 covers the spoke portions Sb1 to Sb3 so as to give good appearances to the spoke portions Sb1 to Sb3. In the example shown in the drawings, the spoke cover 3 is made of a flexible sheet-shaped metal plate, and has a developed shape corresponding to the spoke portions Sb1 to Sb3. Adhesive agent or adhesive sheets for attaching are provided on the backside surface of the spoke cover 3. The spoke cover 3 is assembled to the spoke portions Sb1 to Sb3 by, firstly, wrapping the spoke cover 3 around and attaching the spoke cover 3 to the external surfaces of the spoke portions Sb1 to Sb3. Then, free-end edges 3e of the spoke cover 3 are folded inwards as shown in FIG. 3. Thus, the spoke cover 3 is fixed to the spoke portions Sb1 to Sb3.

Second to fourth marks M2 to M4 (specifically, in the example shown in the drawings, the second mark M2 corresponds to a volume mark, the third mark M3 corresponds to a source mark, and the fourth mark M4 corresponds to a select mark) are either bonded to or printed on a portion of the spoke cover 3 corresponding to the spoke portion Sb1 of the left-hand side. These marks M2 to M4 are arranged in a row. In addition, fifth to seventh marks M5 to M7 (specifically, in the example shown in the drawings, the fifth mark M5 corresponds to a voice mark, the sixth mark M6 corresponds to an up mark, and the seventh mark M7 corresponds to a down mark) are either bonded to or printed on a portion of the spoke cover 3 corresponding to the spoke portion Sb3 of the right-hand side. These marks M5 to M7 are arranged in a zigzag pattern with the fifth mark M5 located on the inner side than the other two marks M6 and M7.

The horn cover 2 and the spoke cover 3 serve as members to which the first to seventh marks M1 to M7 are attached. The first mark M1 serves as a first mark member. The second to fifth marks M2 to M5 serve as a group of second mark members. In addition, the sixth and seventh marks M6 and M7 serve as a group of third mark members.

Figure 4:
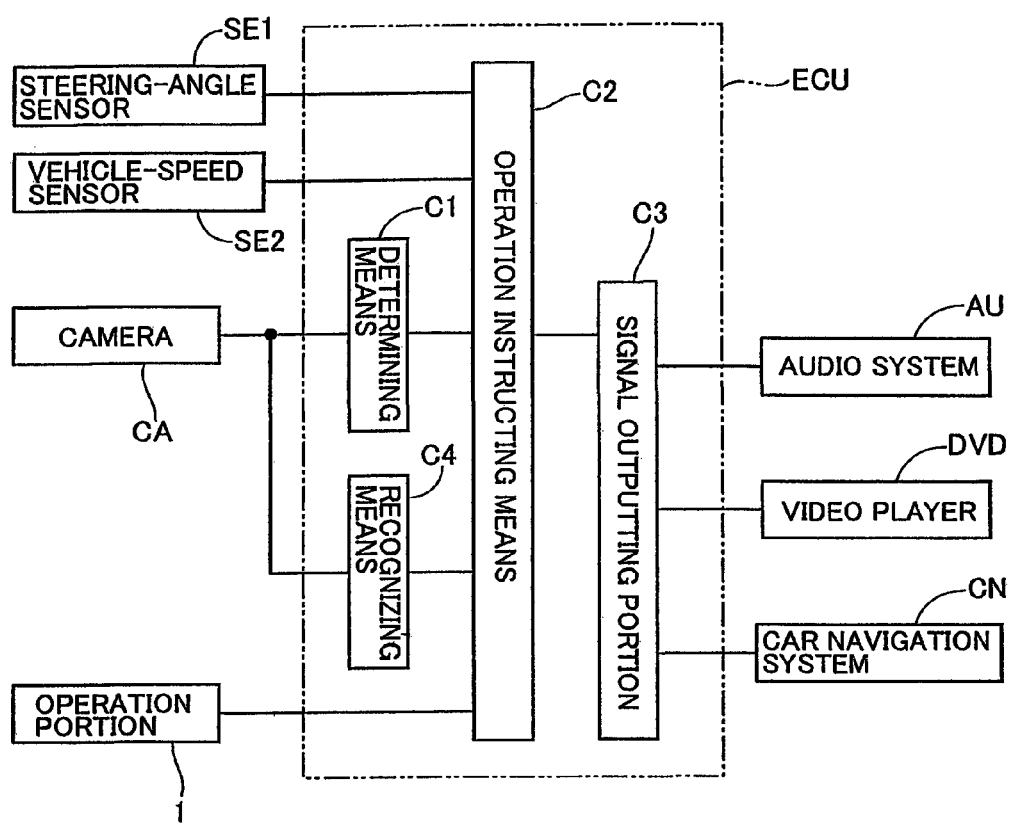
FIG. 4 is a control block diagram of the embodiment.

A camera CA serving as the image capturing means capable of capturing images of the marks M1 to M7 is provided at an adequate position in the compartment, specifically at a position on the ceiling diagonally at the rear side of the driver in the example shown in the drawing. For example, a CCD camera is used as this camera CA. The camera CA is capable of capturing images of the marks M1 to M7 which are arranged in such a manner that the driver can shield these marks M1 to M7 from the camera CA. Accordingly, if the driver shields any of these marks M1 to M7 from the camera CA, the camera CA outputs image data that allow the fact that the mark has been shielded to be clearly recognized to an electronic control unit ECU (see FIG. 4), which will be described in the following paragraph. The camera CA and the electronic control unit ECU together serve as the operation apparatus of the present invention.

The electronic control unit ECU is provided at an adequate position in the compartment, for example, inside of the instrument panel I. The electronic control unit ECU includes determining means C1, operation instructing means C2, a signal outputting portion C3, and recognizing means C4. The determining means C1 is capable of analyzing the image data outputted by the camera CA and then of determining individually whether each of the marks M1 to M7 is or is not shielded from the camera CA on the basis of the analysis data. The operation instructing means C2 outputs operation instructing signals as operation commands to the on-board devices (i.e., the audio system AU, the video player DVD, and the car navigation system CN) on the basis of the results of determination performed by the determining means C1. The signal outputting portion C3 converts the output signals of the operation instructing means C2 to driving signals for the on-board devices, and outputs the driving signals to the corresponding on-board devices. The recognizing means C4 is capable of recognizing hands of the occupants on the basis of the image data outputted by the camera CA.

The camera CA is connected to the respective input sides of the determining means C1 and the recognizing means C4. The respective output sides of the determining means C1 and the recognizing means C4, the external operation portions 1, a steering-angle sensor SE1, and a vehicle-speed sensor SE2 are connected to the input side of the operation instructing means C2. In addition, the output side of the operation instructing means C2 is connected to the input side of the signal outputting portion C3 whereas the on-board devices AU, DVD, and CN are connected to the output side of the signal outputting portion C3.

The operation instructing means C2 selects any one of the following three modes: a stand-by mode, a first active mode, and a second active mode. When the operation instructing means C2 is in the stand-by mode, the operation instructing means C2 allows the on-board devices AU, DVD, and CN to accept operational inputs by means of the external operation portions 1. When the operation instructing means C2 is either in the first active mode or in the second active mode, the operation instructing means C2 prohibits the on-board devices AU, DVD, and CN from accepting such operational inputs. When the operation instructing means C2 is in the stand-by mode, the operation instructing means C2 does not respond to the driver's action of shielding any of the marks other then the first mark M1 (i.e., shielding any of the marks M2 to M7). Accordingly, when in the stand-by mode, the operation instructing means C2 outputs no operational command.

The operation instructing means C2 that has been either in the first active mode or in the second active mode is automatically switched to the stand-by mode if the state of the vehicle is turned to any of predetermined states (in the example shown in the drawings, the states are: a state where a steering operation with a predetermined angle or larger occurs; a state where the vehicle speed changes rapidly within a predetermined period of time; a state where, for a certain period of time after the operation instructing means C2 is switched to any of the first and the second active modes, the driver takes no action to shield any of the second mark M2 to the seventh mark M7; and a state where, although the operation instructing means C2 has been either in the first active mode or in the second active mode, the driver takes an action to shield the first mark M1 again).

Figure 5A:
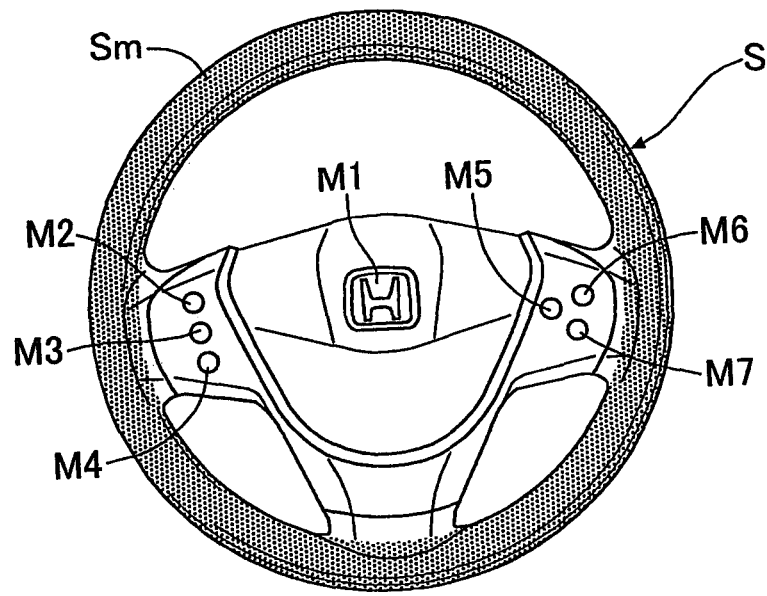
FIGS. 5A to 5C show diagrams to describe, in a simple manner, operation processes to switch operation instructing means from a stand-by mode to a first operation mode.
Figure 5B:
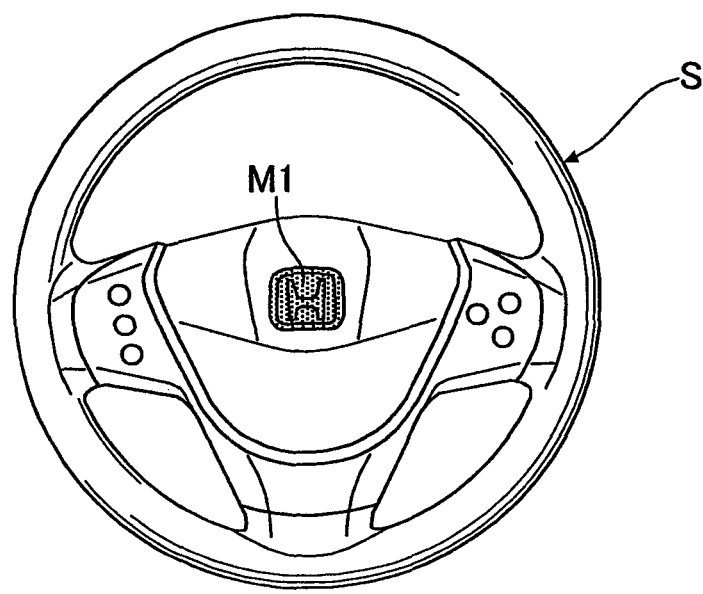
Figure 5C:
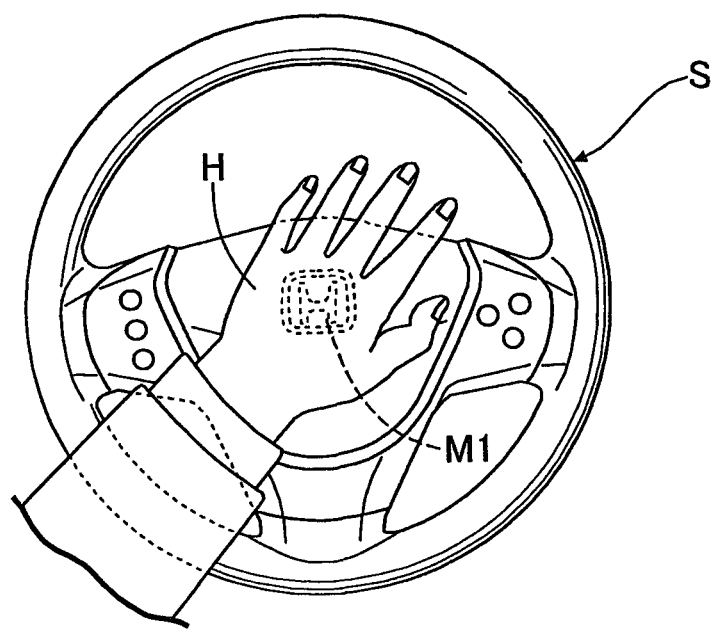

When the operation instructing means C2 is in the stand-by mode, the determining means C1 sets a monitoring target area by recognizing the contour (circular shape) of the steering main body Sm, as shown in FIG. 5A, on the basis of the data of the images taken by the camera CA, and then, as FIG. 5B shows, recognizes the first mark M1 located at the center. Then, if the driver shields, as FIG. 5C shows, the first mark C1 with his/her hand H while the operation instructing means C2 recognizes the first mark C1, the determining means C1 can quickly and surely recognize the occurrence of the shielding action. The determining means C1 outputs the result of such recognition to the operation instructing means C2, and thereby the operation instructing means C2 is switched to the first active mode.

Figure 6A:
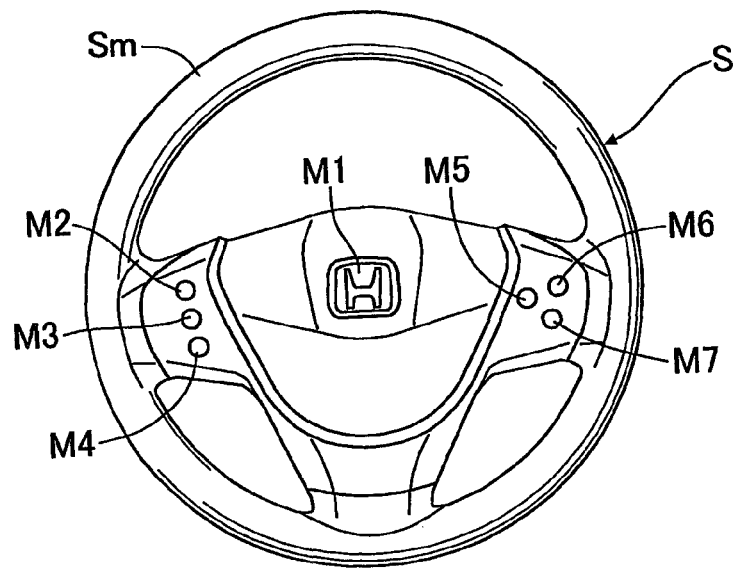
FIGS. 6A to 6C show diagrams to describe, in a simple manner, operation processes to switch the operation instructing means from the first operation mode to a second operation mode.
Figure 6B:
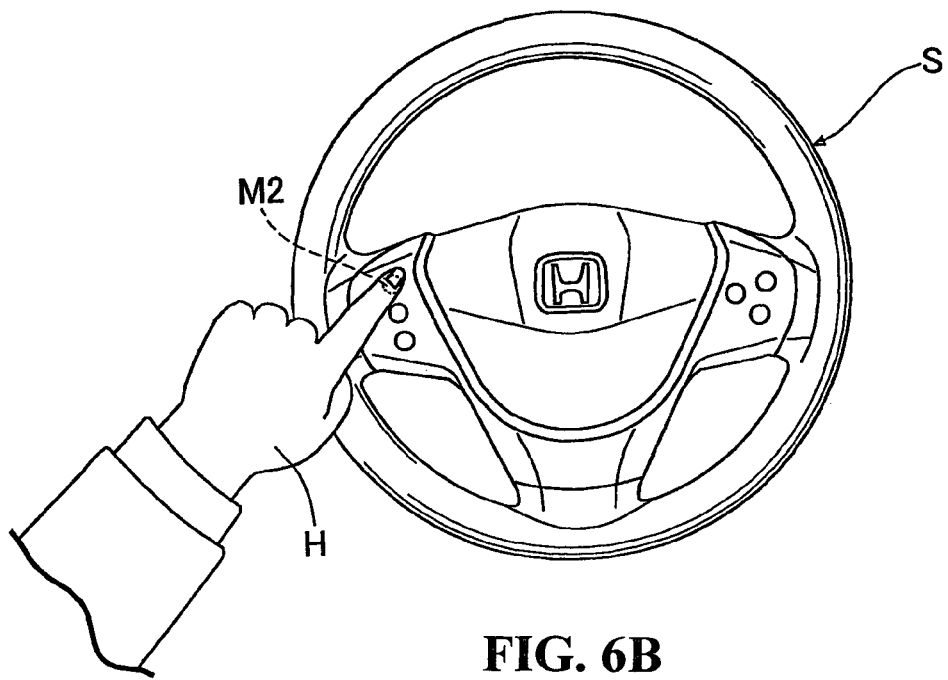
Figure 6C:
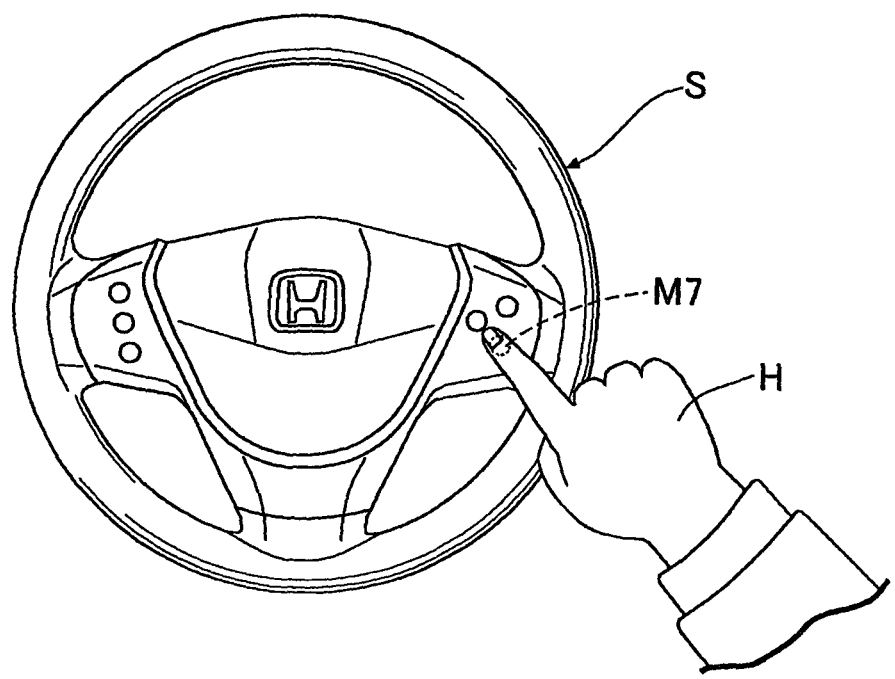

When the operation instructing means C2 is either in the first active mode or in the second active mode, the determining means C1 recognizes the second mark M2 to the seventh mark M7 in the spoke portions Sb1 and Sb3 as shown in FIG. 6A, on the basis of the data of the images taken by the camera CA. Then, if the driver shields, as FIG. 6B shows, any of the group of second mark members (i.e., the second mark M2 to the fifth mark M5) with his/her hand H while the operation instructing means C2 recognizes the second mark M2 to the seventh mark M7, the determining means C1 can quickly and surely recognize the occurrence of such shielding action. On the basis of the result of such recognition, the operation instructing means C2 is switched to the second active mode. In addition, if the driver shields, as FIG. 6C shows, any of the group of third mark members (i.e., the sixth mark M6 and the seventh mark M7) with his/her hand H while the operation instructing means C2 is in the second active mode, the determining means C1 can quickly and surely recognize the occurrence of the shielding action, and can output the result of the recognition to the operation instructing means C2.

Figure 7A:
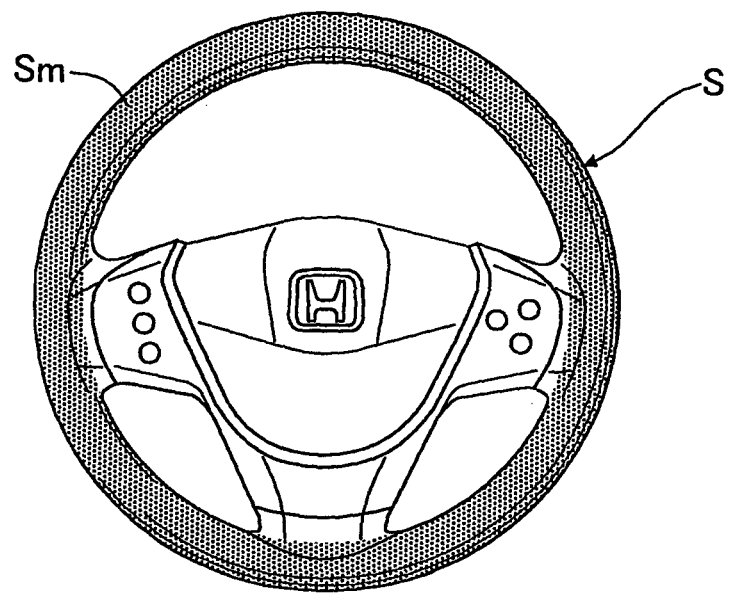
FIGS. 7A and 7B show diagrams to describe, in a simple manner, operation processes to cancel restriction of operations to on-board devices while the vehicle is running and to enable a passenger, that is, an occupant other than the driver, to manually operate the on-board devices even while the vehicle is running.
Figure 7B:
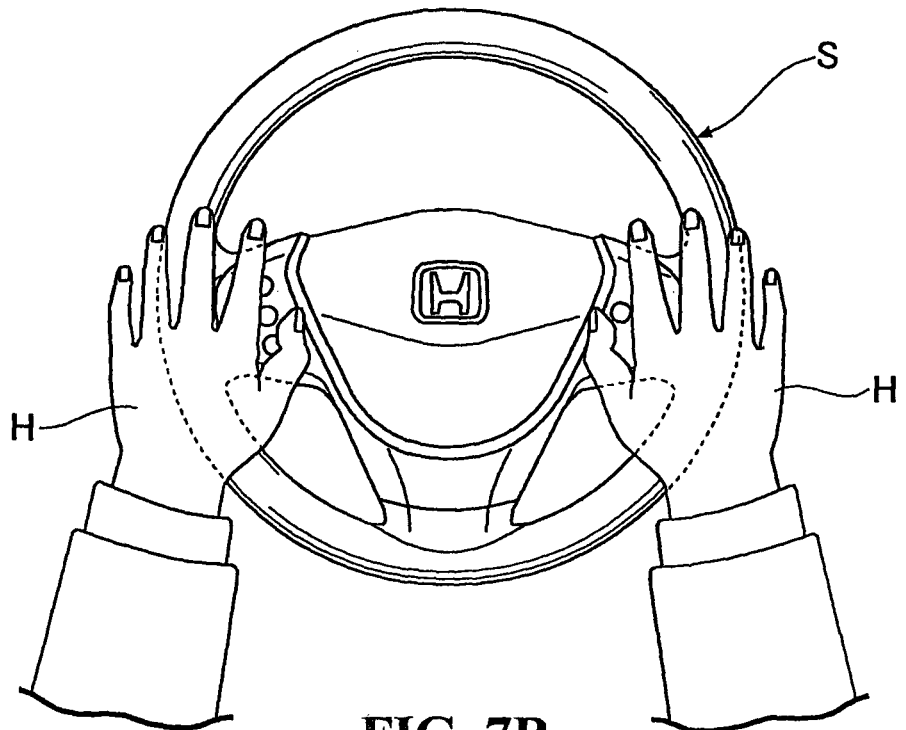

In addition, the recognizing means C4 sets a monitoring target area by recognizing the contour of the steering main body Sm, as shown in FIG. 7A, on the basis of the data of the images taken by the camera CA, irrespective of the mode in which the operation instructing means C2 is. Then, when the operation instructing means C2 determines, on the basis of the detection signals sent by the vehicle-speed sensor SE2, that the automobile is running, and the operation instructing means C4 does not recognize that both of the two hands H of the driver are on the steering main body Sm, the operation instructing means C2 invalidates at least a part of the operation signals from the operation portions 1. In contrast, when the operation instructing means C4 recognizes that both of the two hands H of the driver are on the steering main body Sm, the operation instructing means C2 withholds the invalidation of the operation signals.

If the determining means C1 determines that the first mark M1 is shielded while the operation instructing means C2 is in the stand-by mode, the operation instructing means C2 is switched to the first active mode. When the operation instructing means C2 is in the first active mode, the driver can choose optionally one of the operation targets related to the on-board devices (in the example shown in the drawings, such operation targets are: the "volume"; the "source", i.e., a choice between the video and the audio; the "select", i.e., a choice among album titles and/or song titles; and the "voice", i.e., a choice of the voice search mode of the car navigation system CN) by shielding any of the second mark M2 to the fifth mark M5.

If the determining means C1 determines that any one of the second mark M2 to the fifth mark M5 is shielded while the operation instructing means C2 is in the first active mode, the operation instructing means C2 is switched to the second active mode. When the operation instructing means C2 is in the second active mode, the driver can choose one of the multiple operation parameters related to each of the operation targets by shielding any one of the sixth mark M6 and the seventh mark M7. The operation parameters mentioned above refer to operation contents that the operator should be specifically choose in association with each of the operation targets. In the example shown in the drawings, if the driver chooses the "volume" as the operation target by shielding the second mark M2, the shielding of the sixth mark M6 corresponds to the option of "turning the volume up", and the shielding of the seventh mark M7 corresponds to the option of "turning the volume down".

If the driver chooses the "source" as the operation target by shielding the third mark M3, the shielding of the sixth mark M6 corresponds to the option of "changing the option to be chosen among 'OFF', 'video', and 'audio' one by one in a sequence", and the shielding of the seventh mark M7 corresponds to the option of "changing the option to be chosen among 'OFF', 'video', and 'audio' one by one in the reverse sequence".

If the driver chooses the "select" as the operation target by shielding the fourth mark M4, the shielding of the sixth mark M6 for a long time (e.g., 2 seconds) corresponds to the option of "changing the option to be chosen among the album titles one by one in an ordinary sequence", the shielding of the sixth mark M6 for a short time corresponds to the option of "changing the option to be chosen among the song titles one by one in an ordinary sequence", the shielding of the seventh mark M7 for a long time (e.g., 2 seconds) corresponds to the option of "changing the option to be chosen among the album titles one by one in a reverse sequence", and the shielding of the seventh mark M7 for a short time corresponds to the option of "changing the option to be chosen among the song titles one by one in a reverse sequence".

Next, a sequence of steps of an operation of the operation apparatus will be described in a more specific manner by referring to FIGS. 8 to 11.

1. Volume Adjusting Operation

Figure 8:
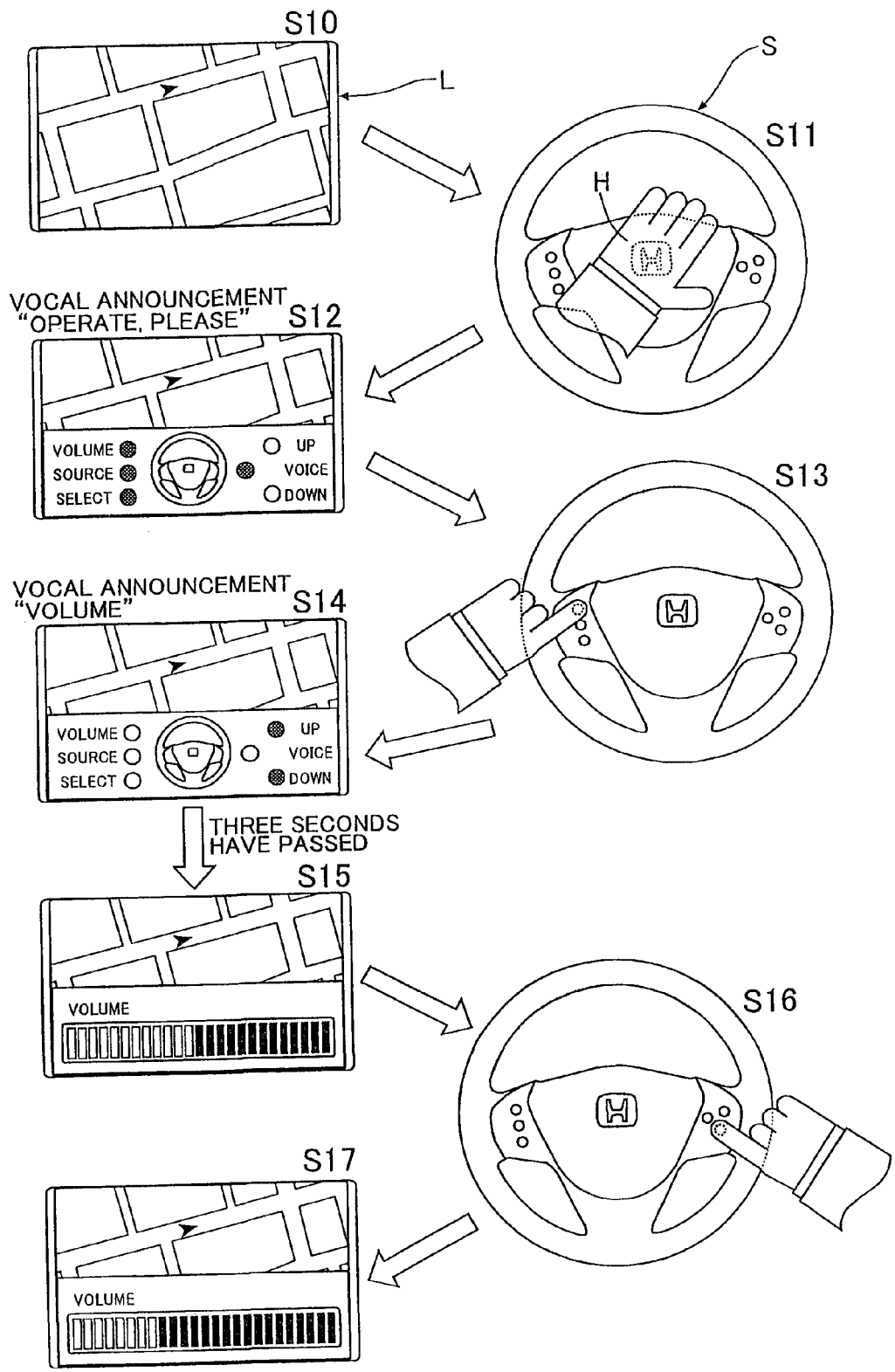
FIG. 8 shows schematic diagrams illustrating a sequence of steps of an operation to adjust the volume.

When the operation instructing means C2 is in the stand-by mode, the display portion L shows an ordinary car navigation screen as shown in the image of step S10 of FIG. 8. In this state, if the operator shields the first mark M1 (step S11), a layer displaying the emphasized marks M2 to M5 one of which the operator should select next appears over the lower half of the screen along with a vocal announcement "Operate, please" (step S12). If the operator shields the second mark M2 (step S13), a layer displaying the emphasized marks M6 and M7 one of which the operator should select next appears over the lower half of the screen along with a vocal announcement "Volume" (step S14). If a predetermined period of time (e.g., 3 seconds) has passed since then, a layer displaying the current volume level then appears (step S15). If the driver shields either the sixth mark M6 or the seventh mark M7 (step S16), the volume level is adjusted in accordance with which one of the marks M6 and M7 the driver has shielded, and a layer displaying the volume level after the adjustment appear (step S17).

2. Source Selecting Operation

Figure 9:
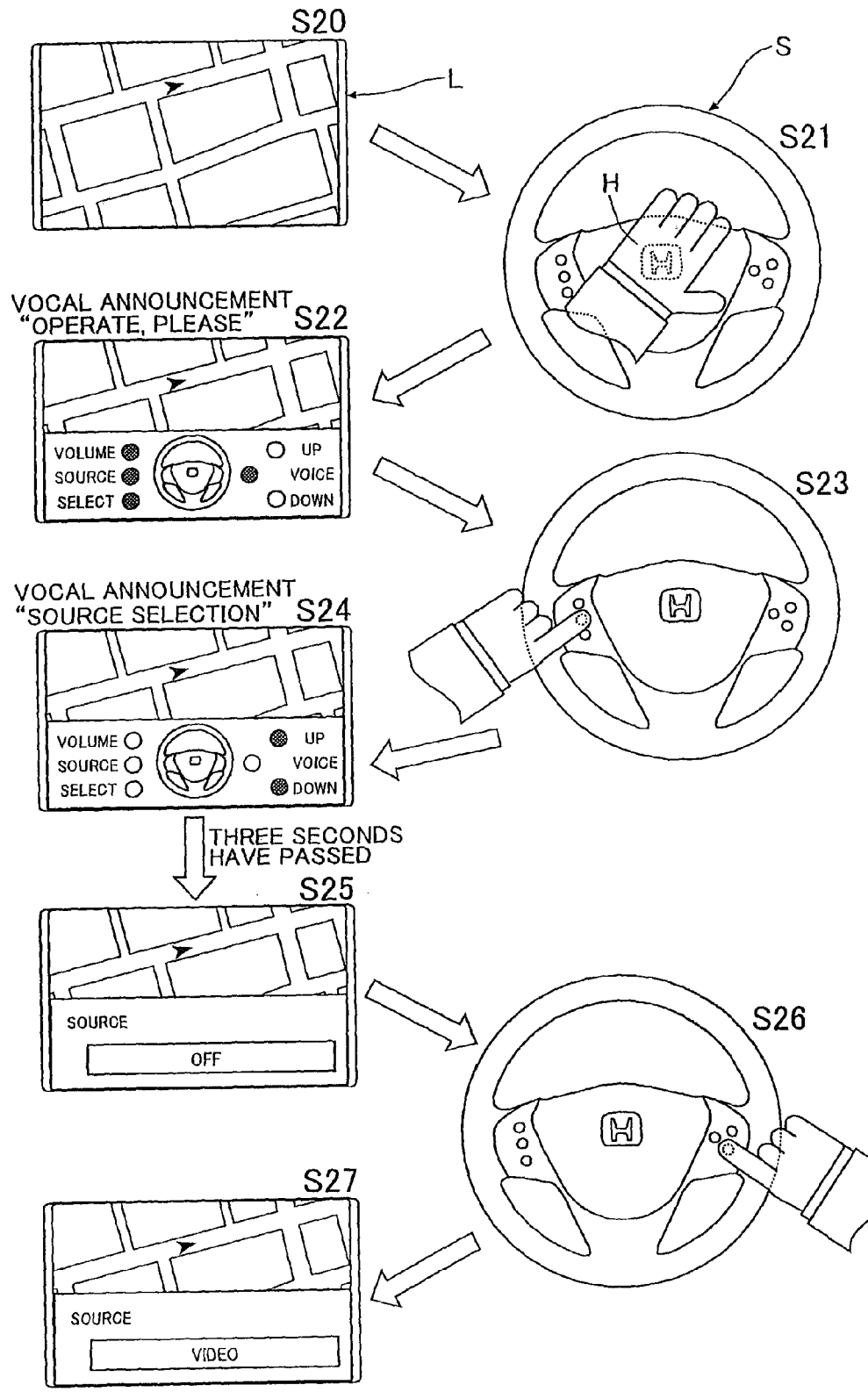
FIG. 9 shows schematic diagrams illustrating a sequence of steps of an operation to select a source.

As FIG. 9 shows, steps S20 to S22 are identical respectively to steps S10 to S12 described above. In the state of Step S22, if the operator shields the third mark M3 (step S23), a layer displaying the emphasized marks M6 and M7 one of which the operator should select next appears over the lower half of the screen along with a vocal announcement "source selection" (step S24). If a predetermined period of time (e.g., 3 seconds) has passed since then, a layer displaying the currently selected source (in FIG. 9, a layer displaying that the option OFF) then appears (step S25). If the driver shields either the sixth mark M6 or the seventh mark M7 (step S26), the option to be selected from the options 'OFF', 'video', and 'audio' changes from one to another either in the ordinary sequence or in the reverse sequence depending upon which one of the marks M6 and M7 the driver has shielded, and a layer displaying the selected source then appear along with a vocal announcement "a selected source is XXXX" (step S27).

3. Album-Title/Song-Title Selecting Operation

Figure 10:
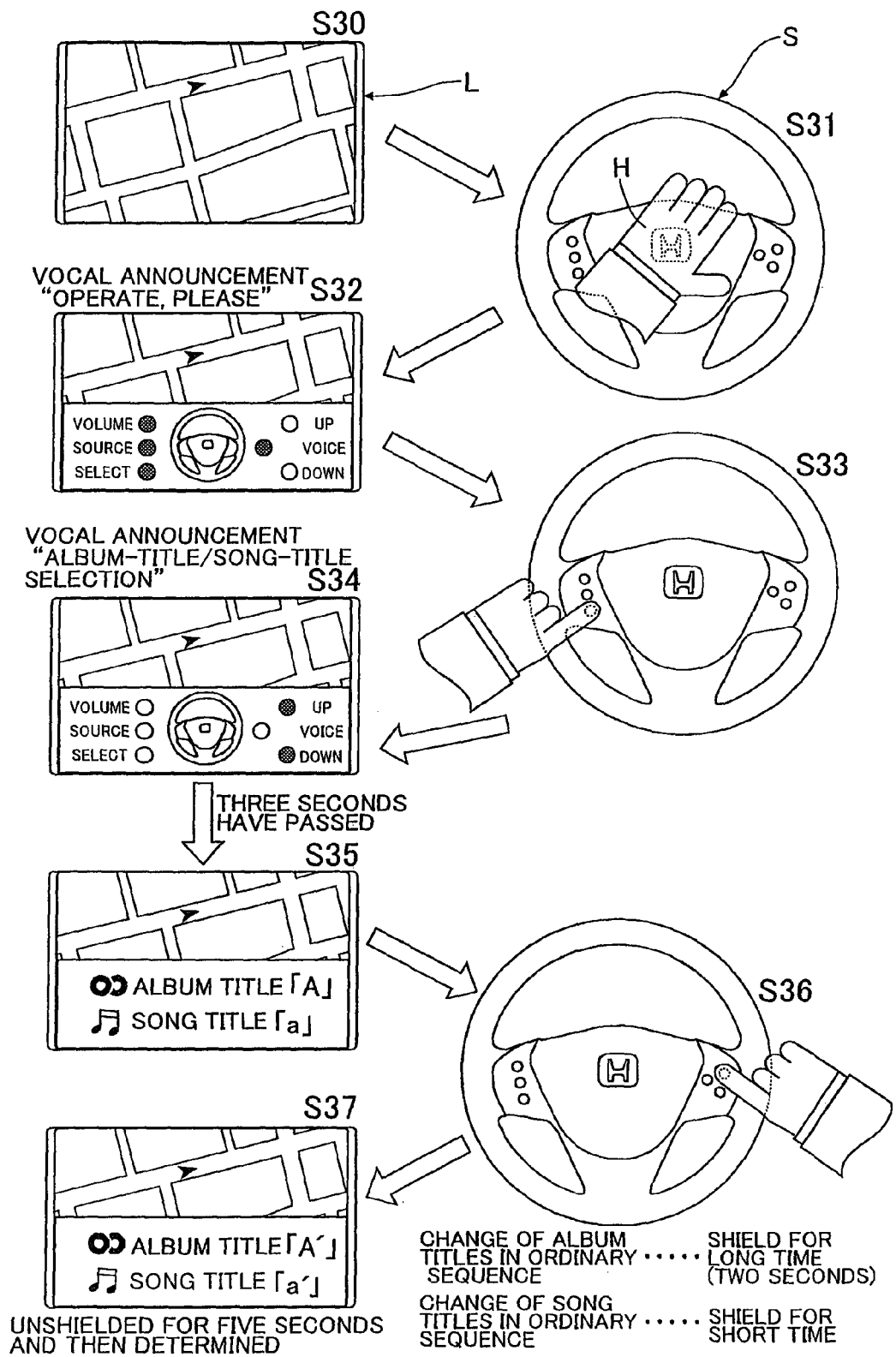
FIG. 10 shows schematic diagrams illustrating a sequence of steps of an operation to choose an album title and a song.

As FIG. 10 shows, steps S30 to S32 are identical respectively to steps S10 to S12 described above. In the state of Step S32, if the operator shields the fourth mark M4 (step S33), a layer displaying the emphasized marks M6 and M7 one of which the operator should select next appears over the lower half of the screen along with a vocal announcement "album-title/song-title selection" (step S34). If a predetermined period of time (e.g., 3 seconds) has passed since then, a layer displaying the currently selected album title and song title then appears (step S35). If the driver shields either the sixth mark M6 or the seventh mark M7 for a long time (e.g., 2 seconds) (step S36), the album title to be selected from the available ones changes from one to another either in the ordinary sequence or in the reverse sequence. If the driver shields either the sixth mark M6 or the seventh mark M7 for a short time (step S36), the song title to be selected from the available ones changes from one to another either in the ordinary sequence or in the reverse sequence. While the changing is going on, a layer displaying the album title and the song title that are newly selected then appears (step S37). If all the marks M2 to M7 have been left unshielded for a predetermined period of time (e.g., 5 seconds) since a layer displaying a particular album title and a song title appeared, the newly selected album title and song title are determined as the final choices.

4. Operation of Switching to Voice Search Mode

Figure 11:
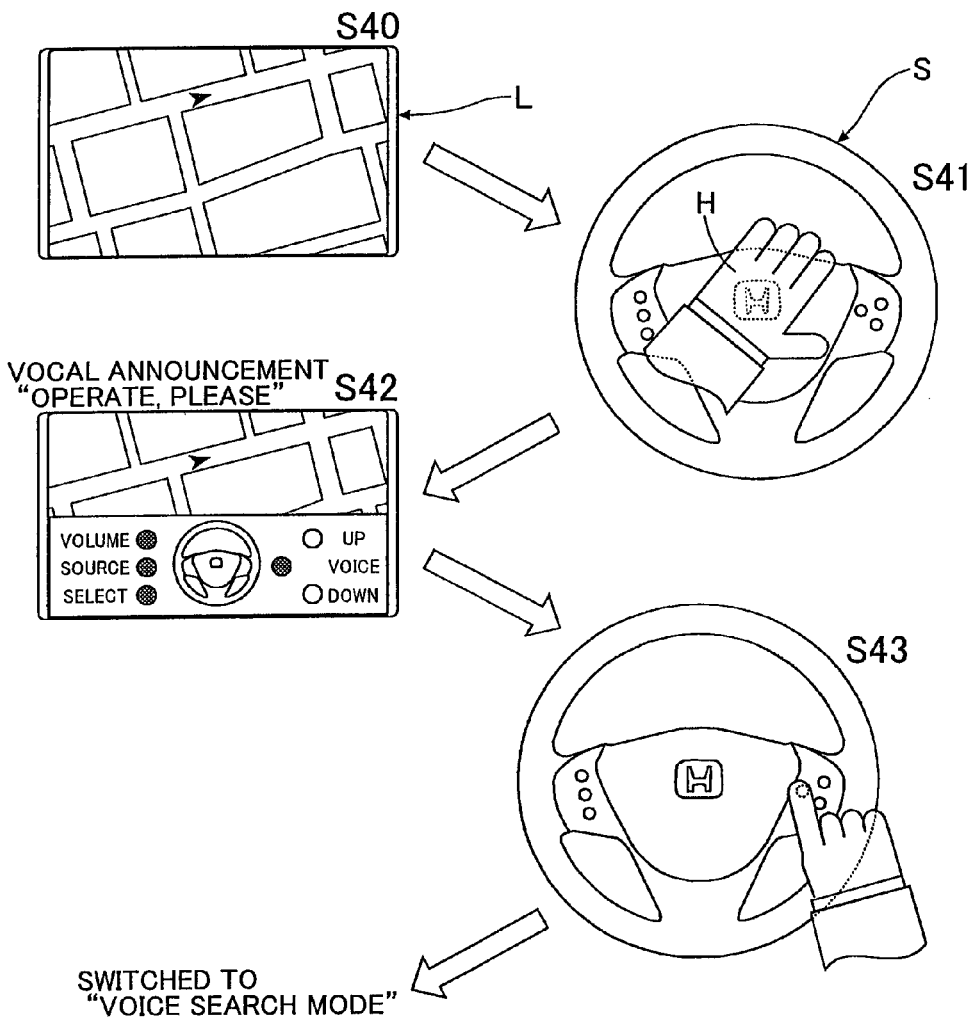
FIG. 11 shows schematic diagrams illustrating a sequence of steps of an operation to switch to a voice search mode.

As FIG. 11 shows, steps S40 to S42 are identical respectively to steps S10 to S12 described above. In the state of Step S42, if the operator shields the fifth mark M5 (step S43), the operation mode of the car navigation system CN can be switched to a conventionally-known voice search mode along with a vocal announcement "voice search."

The embodiment described thus far includes the determining means C1 and the operation instructing means C2. The determining means C1 is capable of determining, on the basis of the image data taken and outputted by the camera CA, whether each of the multiple marks M1 to M7 is or is not shielded. To put it otherwise, whether the mark members are or are not shielded is determined individually by the determining means C1. On the basis of the results of the determination performed by the determining means C1, the operation instructing means C2 outputs operation commands (operation instructing signals) to the corresponding on-board devices AU, DVD, and CN. The operation apparatus of this embodiment can output correctly and accurately the operation commands to the corresponding on-board devices AU, DVD, and CN on the basis of whether each of the marks M1 to M7 is or is not shielded by the operator's hand H. In addition, the series of operational steps to be taken are so easy that the operator easily understand what to do next. Note that the operator sometimes fails to operate the on-board devices AU, DVD, and CN correctly as he/she actually intends due to his/her misunderstanding of what to do next. The operation apparatus of this embodiment can effectively prevents the operator from committing such errors.

In addition, since the operation instructing means C2 relies on a relatively simple determination logic, the cost can be reduced and faster computation can be achieved. In addition, the multiple marks M1 to M7 are formed in the assembled members in the compartment (in the example shown in the drawings, these marks M1 to M7 are formed in the horn cover 2 and the spoke cover 3 that are attachably and detachably attached to the steering wheel S). Accordingly, it is not necessary to drill special through-holes to be used for the image-capturing purposes in the covers 2 and 3, or in the steering wheel S. For this reason, providing the operation apparatus as a retrofitted option is relatively easy, and the positions of the marks M1 to M7 and of the camera CA can be determined in a flexible manner with a relatively high degree of freedom. In addition, the driver holding the steering wheel S can shield the marks M1 to M7 easily and rapidly with his/her own hands H.

In addition, only by shielding the first mark M1, the operator can rapidly and surely switch the mode of the operation instructing means C2 from the stand-by mode to the first active mode. In addition, when the operation instructing means C2 is in the first active mode, the driver can select, rapidly and surely, the operation target from the multiple on-board devices AU, DVD, and CN only by shielding one of the multiple marks M2 to M5. In addition, the operation instructing means C2 is in the first active mode, the operator can rapidly and surely select one of the multiple operation parameters to be determined in relation to the selected operation target, that is, one of the operation contents, only by shielding one of the sixth and the seventh marks M6 and M7.

Meanwhile, the operation instructing means C2 that is in any of the two active modes is automatically switched to the stand-by mode if the state of the vehicle is turned to be in one of the predetermined states (in the example shown in the drawings, the states are: a state where a steering operation with a predetermined angle or larger occurs; a state where the vehicle speed changes rapidly within a predetermined period of time; a state where, for a certain period of time after the operation instructing means C2 is switched to any of the first and the second active modes, the driver takes no action to shield any of the second mark M2 to the seventh mark M7; and a state where, although the operation instructing means C2 has been either in the first active mode or in the second active mode, the driver takes an action to shield the first mark M1 again). Accordingly, the mode of the operation instructing means C2 can be automatically switched back to the stand-by mode if the vehicle is running in a special state that requires the driver to concentrate on driving, e.g., the vehicle is negotiating a curve, and the vehicle is accelerating rapidly, if no operation has been performed for a certain period of time, or, if the driver wants the mode of the operation instructing means C2 to be quickly switched back to the stand-by mode. Hence, the operation apparatus of this embodiment can surely prevent the operation instructing means C2 from outputting unintended commands that would otherwise be outputted by the operator's incorrect operating action in such cases.

While the operation instructing means C2 determines that the automobile is running, the operation instructing means C2 invalidates at least a part of the operation signals from the operation portions 1 unless the recognizing means C4 recognizes that both of the two hands H of the driver are on the steering main body Sm. Accordingly, while the vehicle is running, the operating apparatus of this embodiment puts more emphasis on the safely driving and hence can invalidate at least a part of the driver's manual operating actions by means of the operation portions 1 of the on-board devices AU, DVD, and CN as in the case of conventional operation apparatuses. Even while the vehicle is running, the operation instructing means C2 acts in a different manner on condition that the recognizing means C4 recognizes that both of the driver's hands H are on the steering main body Sm. Since, in this case, any of the operation signals outputted from the operation portions 1 can be considered as a result of the operating action not by the driver but by a passenger, i.e., anyone but the driver, the operation instructing means C2 withholds the invalidation of the operation signals and thus allows the operating actions by a passenger, i.e., anyone but the driver, to be valid. Accordingly, even while the automobile is running, a passenger, i.e., an occupant other than the driver, can operate the on-board devices AU, DVD, and CN as long as the driver holds the steering wheel S with both of his/her hands H. This makes the operation apparatus easier-to-use and more convenient.

An embodiment has been described thus far, but the present invention is not limited to the above-described embodiment. Various modifications in design can be made without departing from the scope of the present invention described in Claims.

For example, in the above-described embodiment, the spoke cover 3 that is attachably and detachably attached to the spoke portions Sb1 to Sb3 of the steering wheel S serves as the assembled member where the second marks M2 to the seventh marks M7 are provided. However, the marks may be provided directly in the spoke portions provided as assembled members. Alternatively, the marks may be provided directly in another assembled member (an instrument panel and an arm rest, for example) which is provided in the compartment in such a manner as to be located within the reach of the operators' hands. Further, the marks may be provided in cover members that are attachably and detachably attached to an instrument panel, an arm rest or the like.

In addition, in the embodiment, the on-board devices that can be operated by means of the operation apparatus of the present invention are the audio system AU, the video player DVD, and the like. The operation targets may be other kinds of on-board devices, for example, such as an air conditioning system and a television set.

In addition, in the above-described embodiment, the outputting of the operation commands (operation instructing signals) by the operation instructing means C2 to the corresponding on-board devices is based on the results of determination performed by the determining means C1 as to whether any of the marks M1 to M7 is or is not shielded. Alternatively, the outputting of the operation commands (operation instructing signals) to the corresponding on-board devices may be based on a determination logic combining the results of determination performed by the determining means C1 as to whether any of the marks M1 to M7 is or is not shielded and the results of the recognition of the hands performed by the recognizing means C4. Even in this case, what the recognizing means has to do is to distinguish a hand from other parts of the body (head, arms, etc.). Accordingly, the modification requires no such a complex logic as one that is needed by the conventional technique.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An operation apparatus for on-board devices in an automobile, comprising:
   an image capturing device which captures images of a plurality of mark members provided on an assembled member in a compartment of the automobile;
   a determining means for determining individually whether each of the mark members is or is not shielded on the basis of image data outputted by said image capturing device;
   an operation instructing means for outputting an operation command to the on-board devices in accordance with a result of the determining by said determining means;
   a recognizing means for recognizing a hand of the driver of the automobile based on image data outputted by said image capturing device; and
   a vehicle-speed sensor which detects a speed of the automobile; and an operation portion which controls the on-board devices, said operation portion being operable by a non-driver occupant of the automobile,
   wherein said plurality of mark members are positioned so that a hand of the driver of the automobile can shield the mark members from said image capturing device, and
   wherein when said operation instructing means determines that the automobile is running based on a detection signal of said vehicle-speed sensor, said operation instructing means invalidates at least a part of an operation signal from said operation portion unless said recognizing means recognizes that two hands of the driver are on a steering wheel of the automobile.

2. The operation apparatus according to claim 1, wherein said assembled member is detachably attached to a steering wheel of the automobile.

3. The operation apparatus according to claim 2,
   wherein said plurality of mark members includes at least one first mark member and a plurality of second mark members,
   wherein when said operation instructing means is in a stand-by mode, said operation instructing means is switched to a first active mode upon determination by said determining means that at least said first mark member is shielded, and
   wherein when said operation instructing means is in said first active mode, said operation instructing means selects an operation target from the on-board devices when at least one of said plurality of second mark members is shielded.

4. The operation apparatus according to claim 3,
   wherein said plurality of mark members further includes a plurality of third mark members,
   wherein when said operation instructing means is in said first active mode, said operation instructing means is switched to a second active mode upon determination by said determining means that at least one of said plurality of second mark members is shielded, and
   wherein when said operation instructing means is in said second active mode, said operation instructing means selects one of a plurality of operation parameters related to the operation target when at least one of said plurality of third mark members is shielded.

5. The operation apparatus according to claim 4, wherein said operation instructing means in either said first active mode or said second active mode is automatically switched to said stand-by mode if the automobile is in a predetermined state.

6. The operation apparatus according to claim 3, wherein said operation instructing means in said first active mode is automatically switched to said stand-by mode if the automobile is in a predetermined state.

7. The operation apparatus according to claim 1,
wherein said plurality of mark members includes at least one first mark member and a plurality of second mark members,
wherein when said operation instructing means is in a stand-by mode, said operation instructing means is switched to a first active mode upon determination by said determining means that at least said first mark member is shielded, and
wherein when said operation instructing means is in said first active mode, said operation instructing means selects an operation target from the on-board devices when at least one of said plurality of second mark members is shielded.

8. The operation apparatus according to claim 7,
wherein said plurality of mark members further includes a plurality of third mark members,
wherein when said operation instructing means is in said first active mode, said operation instructing means is switched to a second active mode upon determination by said determining means that at least one of said plurality of second mark members is shielded, and
wherein when said operation instructing means is in said second active mode, said operation instructing means selects one of a plurality of operation parameters related to the operation target when at least one of said plurality of third mark members is shielded.

9. The operation apparatus according to claim 8, wherein said operation instructing means in either said first active mode or said second active mode is automatically switched to said stand-by mode if the automobile is in a predetermined state.

10. The operation apparatus according to claim 7, wherein said operation instructing means in said first active mode is automatically switched to said stand-by mode if the automobile is in a predetermined state.

11. An operation apparatus for on-board devices in an automobile, comprising:
an image capturing device which captures images of a plurality of mark members provided on an assembled member in a compartment of the automobile;
a determining means for determining individually whether each of the mark members is or is not shielded on the basis of image data outputted by said image capturing device; and
an operation instructing means for outputting an operation command to the on-board devices in accordance with a result of the determining by said determining means,
wherein said plurality of mark members are positioned so that a hand of a driver of the automobile can shield the mark members from said image capturing device,
wherein said plurality of mark members includes at least one first mark member and a plurality of second mark members,
wherein when said operation instructing means is in a stand-by mode, said operation instructing means is switched to a first active mode upon determination by said determining means that at least said first mark member is shielded, and
wherein when said operation instructing means is in said first active mode, said operation instructing means selects an operation target from the on-board devices when at least one of said plurality of second mark members is shielded.

12. The operation apparatus according to claim 11, wherein said assembled member is detachably attached to a steering wheel of the automobile.

13. The operation apparatus according to claim 12,
wherein said plurality of mark members further includes a plurality of third mark members,
wherein when said operation instructing means is in said first active mode, said operation instructing means is switched to a second active mode upon determination by said determining means that at least one of said plurality of second mark members is shielded, and
wherein when said operation instructing means is in said second active mode, said operation instructing means selects one of a plurality of operation parameters related to the operation target when at least one of said plurality of third mark members is shielded.

14. The operation apparatus according to claim 13, wherein said operation instructing means in said first active mode is automatically switched to said stand-by mode if the automobile is in a predetermined state.

15. The operation apparatus according to claim 12, wherein said operation instructing means in said first active mode is automatically switched to said stand-by mode if the automobile is in a predetermined state.

16. The operation apparatus according to claim 11,
wherein said plurality of mark members further includes a plurality of third mark members,
wherein when said operation instructing means is in said first active mode, said operation instructing means is switched to a second active mode upon determination by said determining means that at least one of said plurality of second mark members is shielded, and
wherein when said operation instructing means is in said second active mode, said operation instructing means selects one of a plurality of operation parameters related to the operation target when at least one of said plurality of third mark members is shielded.

17. The operation apparatus according to claim 16, wherein said operation instructing means in said first active mode is automatically switched to said stand-by mode if the automobile is in a predetermined state.

18. The operation apparatus according to claim 11, wherein said operation instructing means in said first active mode is automatically switched to said stand-by mode if the automobile is in a predetermined state.

* * * * *